United States Patent [19]
Narita et al.

[11] Patent Number: 5,992,878
[45] Date of Patent: Nov. 30, 1999

[54] AIR BAG SYSTEM FOR VEHICLE SEAT

[75] Inventors: Masanori Narita; Yasuki Matsuura, both of Kanagawa-ken, Japan

[73] Assignee: Nissan Motor Co., Ltd., Kanagawa-ken, Japan

[21] Appl. No.: 08/978,871

[22] Filed: Nov. 28, 1997

[30] Foreign Application Priority Data

Nov. 29, 1996 [JP] Japan ................................. 8-320097

[51] Int. Cl.⁶ ................................................ B60R 21/22
[52] U.S. Cl. ..................................... 280/730.2; 280/728.2
[58] Field of Search ............................. 280/730.2, 728.2, 280/741, 732, 730.1

[56] References Cited

U.S. PATENT DOCUMENTS

| | | | |
|---|---|---|---|
| 4,153,273 | 5/1979 | Risko | 280/728.2 |
| 4,842,300 | 6/1989 | Ziomek et al. | 280/732 |
| 5,499,840 | 3/1996 | Nakano | 280/730.2 |
| 5,803,490 | 9/1998 | Seventko et al. | 280/730.2 |
| 5,816,610 | 10/1998 | Higashiura et al. | 280/730.2 |
| 5,845,932 | 12/1998 | Kimura et al. | 280/730.2 |

FOREIGN PATENT DOCUMENTS

4-50052  2/1992  Japan .

*Primary Examiner*—Paul N. Dickson
*Attorney, Agent, or Firm*—McDermott, Will & Emery

[57] ABSTRACT

A metal case consists of a inner case and an outer case, the inner case and the outer case have respective rear surface portions which are mutually separated but overlapped on a back side of the metal case, an inflator has fitting bolts which penetrate the rear surface portions of the inner case, the inflator secured to the rear surface portion of the inner case by fitting bolts and nuts, and top ends of the fitting bolts are covered with the rear surface portion of the outer case. Accordingly, even when a passenger pushes or touches a seat back above the fitting bolts, he or she feels smooth or pleasant to the touch.

6 Claims, 6 Drawing Sheets

AIR BAG SYSTEM FOR VEHICLE SEAT

BACKGROUND OF THE INVENTION

The present invention relates to an air bag system for a vehicle seat and, more particularly, an air bag system for a vehicle seat capable of absorbing an impact load applied from a side plate of a vehicle body to a passenger to protect the passenger from the impact load by forward spreading out an air bag provided in one side portion of a seat back when a vehicle collides in a side crash.

In order to avoid the direct impact between the side plate of the vehicle body such as a door plate deformed by the impact load and the passenger sat on the seat when the vehicle crashes at its side, various air bag systems have been proposed in the prior art, as has been known in Patent Application Publication (KOKAI) 4-50052, for example.

In a common configuration of this kind of the air bag system, an inflator and an air bag are installed together in a metal case. The air bag system is fitted to a side bracket which is secured to an outside of a seat back frame in the vehicle width direction. When the vehicle crash happened, the high pressure gas is immediately generated from the inflator and then injected into the air bag, so that the air bag can rapidly spread out forward from an opening portion of the metal case. At that time, the air bag is able to break through the stitching portion of the seat back cover to thus protrude into a compartment in a moment. A spreading direction of the air bag can be regulated by the opening portion of the metal case.

Fitting bolts are provided on the back surface of the inflator so as to protrude backward. The fitting bolts penetrate the rear surface portion of the metal case and fixed by the nuts. Why the inflator is secured on the rear surface portion of the metal case is due to receive and absorb the rearward reaction force which is developed by an expanding of the air bag.

SUMMARY OF THE INVENTION

However, in the air bag system in the prior art, the fitting bolts penetrate the rear surface portion of the metal case and the tips of the fitting bolts protrude backward from the rear surface portion of the metal case. Therefore, when the passenger pushes or touches the seat back above the fitting bolts by hand, he or she have a strange feeling and a poor feeling to the touch.

Therefore, it is an object of the present invention to provide the air bag system for the vehicle seat which gives a pleasant feeling when the passenger pushes or touches the seat back above the fitting bolts.

In order to achieve the above object of the present invention, there is provided an air bag system for a vehicle seat comprising a metal case fitted to a side bracket provided to a seat back frame and having an opening directed to a front side of a vehicle; an inflator arranged in the metal case; and an air bag installed in the metal case, and spreading out from the opening to the front side of the vehicle when a gas generated from the inflator is injected; wherein the metal case consists of a first case member and a second case member, the first case member and the second case member have respective rear surface portions which are mutually separated but overlapped on a back side of the metal case, the inflator is secured to the rear surface portion positioned on the front side of the vehicle by fitting bolts, and top ends of the fitting bolts being directed to the rear side of the vehicle are covered with the rear surface portion positioned on the rear side of the vehicle.

The first case member may be an inner case forming an inner part of the metal case, the second case member may be an outer case forming an outer part of the metal case, and the rear surface portion of the outer case may be placed behind the rear surface portion of the inner case.

According to the above configuration, since top ends of the fitting bolts of the inflator are covered with the rear surface portion positioned on the rear side of the vehicle from the backward direction, the passenger is pleasant to the touch when he or she pushes the rear portion of the air bag module installed in the seat back by the hand.

One of the rear surface portions may have a convex portion to protrude toward other of the rear surface portions. The convex portion comes into contact with other of the rear surface portions to prevent the rear surface portion positioned on the rear side of the vehicle from coming into contact with top ends of the fitting bolts positioned on the rear side of the vehicle when the rear surface portion positioned on the rear side of the vehicle is shifted to the front side of the vehicle.

In this case, a projection height of the convex portion from one of the rear surface portions may be larger than a projection height of the fitting bolt from the rear surface portion positioned on the front side of the vehicle.

The convex portion may have a height which corresponds to a clearance dimension between the rear surface portions. The convex portion may protrude backward from the rear surface of the inner case.

According to the above configuration, the rear surface portion positioned on the rear side of the vehicle is brought into contact with the convex portion before it touches the top ends of the fitting bolts when it is pushed by the hand from the back side to the front side, and as a result the rear surface portion positioned on the rear side of the vehicle can be prevented being forward deformed further more. In addition, even if a backward reaction force is applied to the rear surface portion positioned on the front side of the vehicle upon expansion of the air bag, backward deformation of the rear surface portion positioned on the front side of the vehicle, which receives the reaction force, can be prevented since such reaction force can be transmitted to the rear surface portion positioned on the front side of the vehicle via the convex portion.

DESCRIPTION OF THE PREFERRED EMBODIMENT

A preferred embodiment of the present invention will be explained which reference to FIGS. 1 to 6 hereinafter. In FIGS. 1 to 6, a symbol "II" indicates an outer side along the vehicle width direction and a symbol "III" indicates an inner side along the vehicle width direction.

Figure 1:
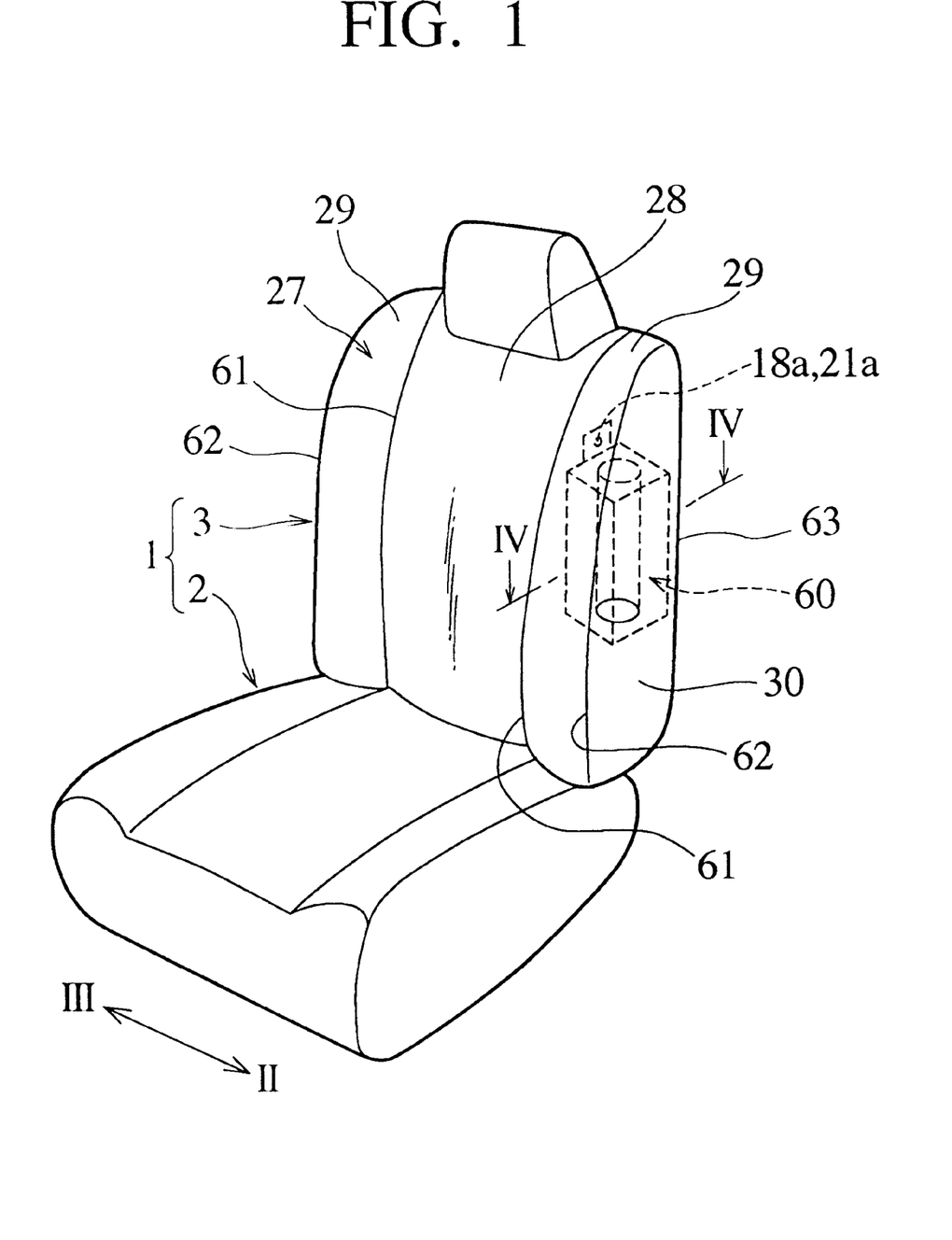
FIG. 1 is a perspective view showing a vehicle seat according to an embodiment of the present invention.
Figure 2:
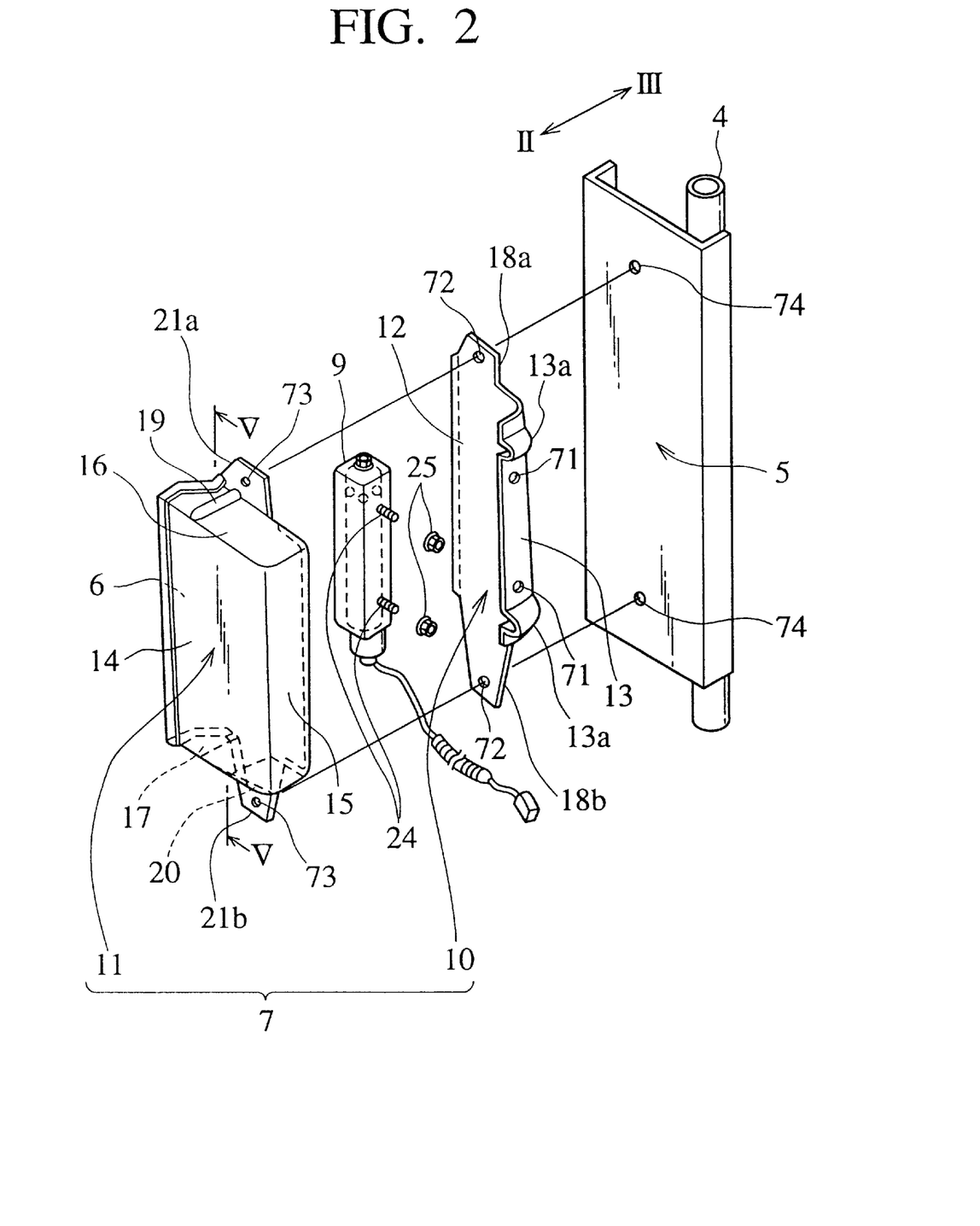
FIG. 2 is an exploded view showing an air bag module for use in the vehicle seat in FIG. 1.

FIG. 1 shows a left front seat 1. This front seat 1 consists of a seat cushion 2 back/forth movably fitted to a floor panel (not shown) and a back/forth rotatable seat back 3. An inverse U-shaped seat back frame 4, though not clearly depicted in figures, is provided in the inside of the seat back 3. A side bracket 5 is secured to an outer portion (door side portion) of the seat back frame 4 in the vehicle width direction.

An air bag module 60 as the air bag system is fitted to the side bracket 5. The air bag module 60 is made up of a metal case 7 which has an opening portion 6 directed to the front side of the vehicle, an air bag 8 which is folded like a bellows in the metal case 7, and an inflator 9 which generates a high pressure gas to inflate and expand the air bag 8. The air bag 8 and the inflator 9 are installed together in the metal case 7. The opening portion 6 of the metal case 7 is covered with an easily breakable thin sheet (not shown).

The metal case 7 consists of an inner case 10 (first case member) and an outer case 11 (second case member). The inner case 10 constitutes an inner side surface portion 12 and a rear surface portion 13 of the metal case 7. The outer case 11 constitutes an outer side surface portion 14, a rear surface portion 15, an upper surface portion 16, and a lower surface portion 17 of the metal case 7. The rear surface portion 13 of the inner case 10 and the rear surface portion 15 of the outer case 11 are mutually overlapped at a predetermined clearance 50 (see FIG. 3) such that the rear surface portion 15 of the outer case 11 is placed behind the rear surface portion 13 of the inner case 10. As will be described later, such clearance 50 may be set longer than at least a height of a nut 25 and to sufficiently exceed top ends of fitting bolts 24.

A pair of upper and lower fitting holes 71 are formed in the rear surface portion 13 of the inner case 10. Convex portions 13a are formed on the rear surface portion 13 in the upper and lower positions of respective fitting holes 71 so as to protrude backward. Each of the convex portions 13a has a convex shape or a height which corresponds to the dimension of the above clearance 50. Namely, the height of the convex portion 13a is approximately identical with the length of the clearance 50. The height of the convex portion 13a is not necessarily formed to coincide with the dimension of the clearance 50. The height of the convex portion 13a may be set longer than at least a projection amount of the top end of the fitting bolt 24, as described later.

On the upper and lower surfaces of the inner case 10 are formed flanges 18a, 18b which protrude oppositely along the upward and downward directions respectively. In addition, a top end of the inner side surface portion 12 constituting an edge portion of the opening portion 6 of the inner case 10 is folded back to the outside. This is because, when the air bag 8 is spreading out forward, the top end of the inner side surface portion 12 of the inner case 10 can be prevented from acting as a sharp edge for the air bag 8.

Similarly, a top end of the outer side surface portion 14 of the outer case 11 is folded back to the outside for the same reason. On the upper surface portion 16 and the lower surface portion 17 of the outer case 11 near the opening portion 6, bead portions 19, 20 are formed along the vehicle width direction respectively. On the upper surface portion 16 and the lower surface portion 17 of the outer case 11 are formed flanges 21a, 21b which protrude oppositely in the upward and downward directions from respective innermost side ends in the vehicle width direction. The upper bead portion 19 formed on the upper surface portion 16 has a continuous semicircular sectional shape. The lower bead portion 20 formed on the lower surface portion 17 has a tapered shape which inclines downward from the lower surface portion 17 to the flange 21b (see FIG. 6). These upper and lower bead portions 19, 20 do not restrict or disturb an inner space of the metal case 7 since they are formed on the outside of the metal case 7.

The lower bead portion 20 is downward inclined to the inside along the vehicle width direction and is then connected to the lower flange 21b. To this end, the lower bead portion 20 is preferable to receive a weight of the air bag module 60 by the lower flange portion 21b. Since the upper bead portion 19 has a simple semicircular shape in section, it can be readily formed by press working. The upper and lower bead portions 19, 20 are formed on the upper surface portion 16 and the lower surface portion 17 respectively, but no bead portion is formed on the outer side surface portion 14. This is because the metal case 7 has a longitudinal shape which has a dimension in the height direction larger than that in the vehicle width direction and therefore the air bag 8 which is spreading out forward is strongly brought into contact with the outer side surface portion 14 of the opening portion 6 to thus be rubbed therewith.

The upper and lower flanges 21a, 21b formed on the upper surface portion 16 and the lower surface portion 17 of the outer case 11 are superposed mutually with the upper and lower flanges 18a, 18b of the inner case 10 such that the upper and lower flanges 21a, 21b are come into contact with the upper and lower flanges 18a, 18b at their inner ends in the vehicle width direction. Fitting holes 72, 73 are formed in the upper and lower flanges 18a, 18b and the upper and lower flanges 21a, 21b respectively. Fitting holes 74 are formed in the side bracket 5 in registration with the fitting holes 72, 73. The outer case 11 and the inner case 10 are fixed to the side bracket 5 with bolts 22 and nuts 23 through these fitting holes 72, 73, 74. The fitting hole 73 in the upper flange 21a is arranged so as to pass through a prolonged surface passing through the upper bead portion 19 along the vehicle width direction. The fitting hole 73 in the lower flange 21b is arranged so as to pass through a prolonged surface passing through the lower bead portion 20 along the vehicle width direction. Respective ones of the bolts 22 and the nuts 23 may be fixed in advance to the fitting hole 74 of the side bracket 5 by welding.

A pair of upper and lower fitting bolts 24 are provided on the back surface of the inflator 9 so as to protrude backward. The fitting bolts 24 are passed through the fitting holes 71 formed in the rear surface portion 13 of the inner case 10 and then fixed by the nuts 25. Top ends of the fitting bolts 24 are covered with the rear surface portion 15 of the outer case 11 on the back side of the metal case 7.

Figure 3:
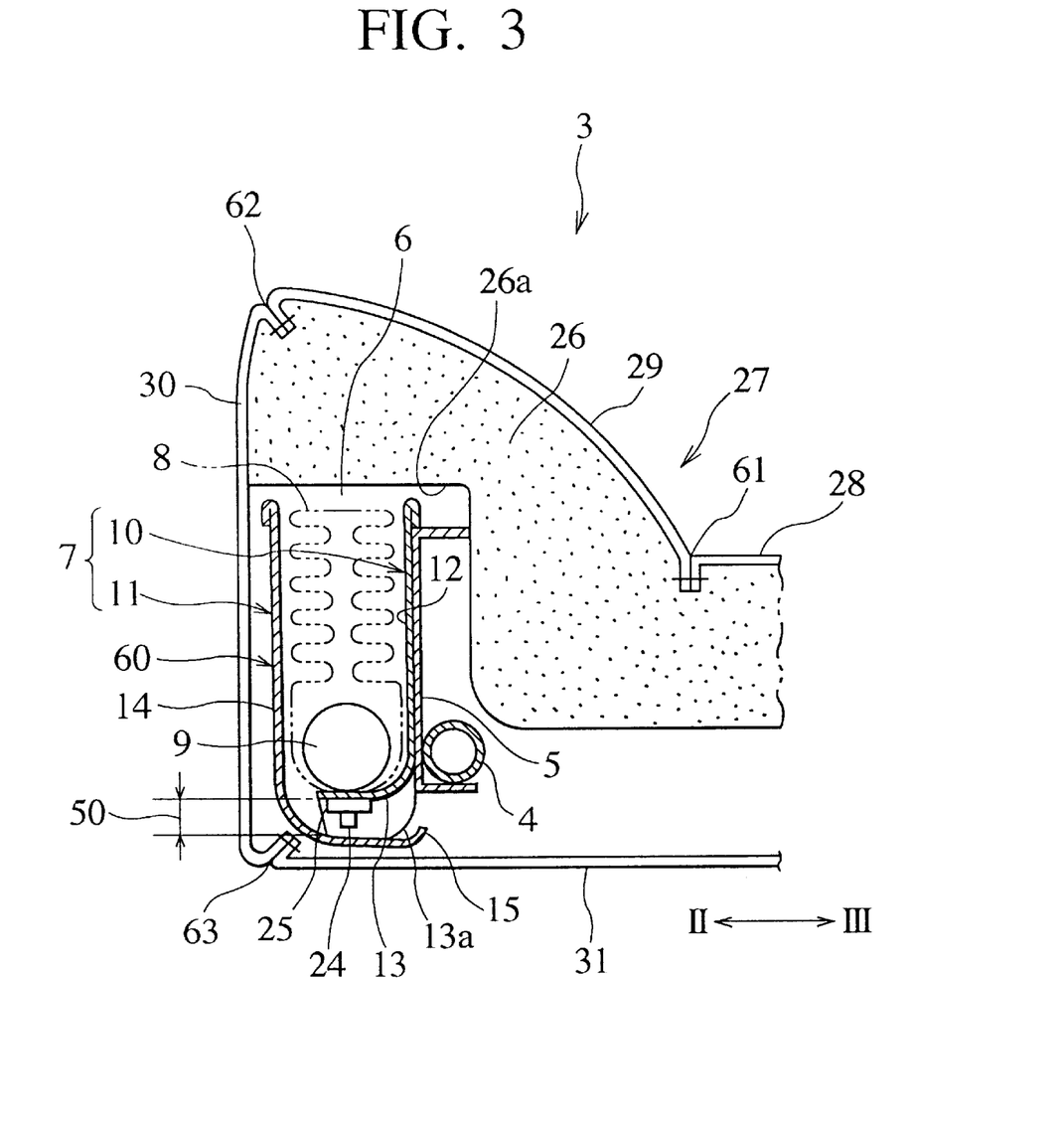
FIG. 3 is a sectional view showing the vehicle seat taken along a line IV—IV in FIG. 1.
Figure 4:
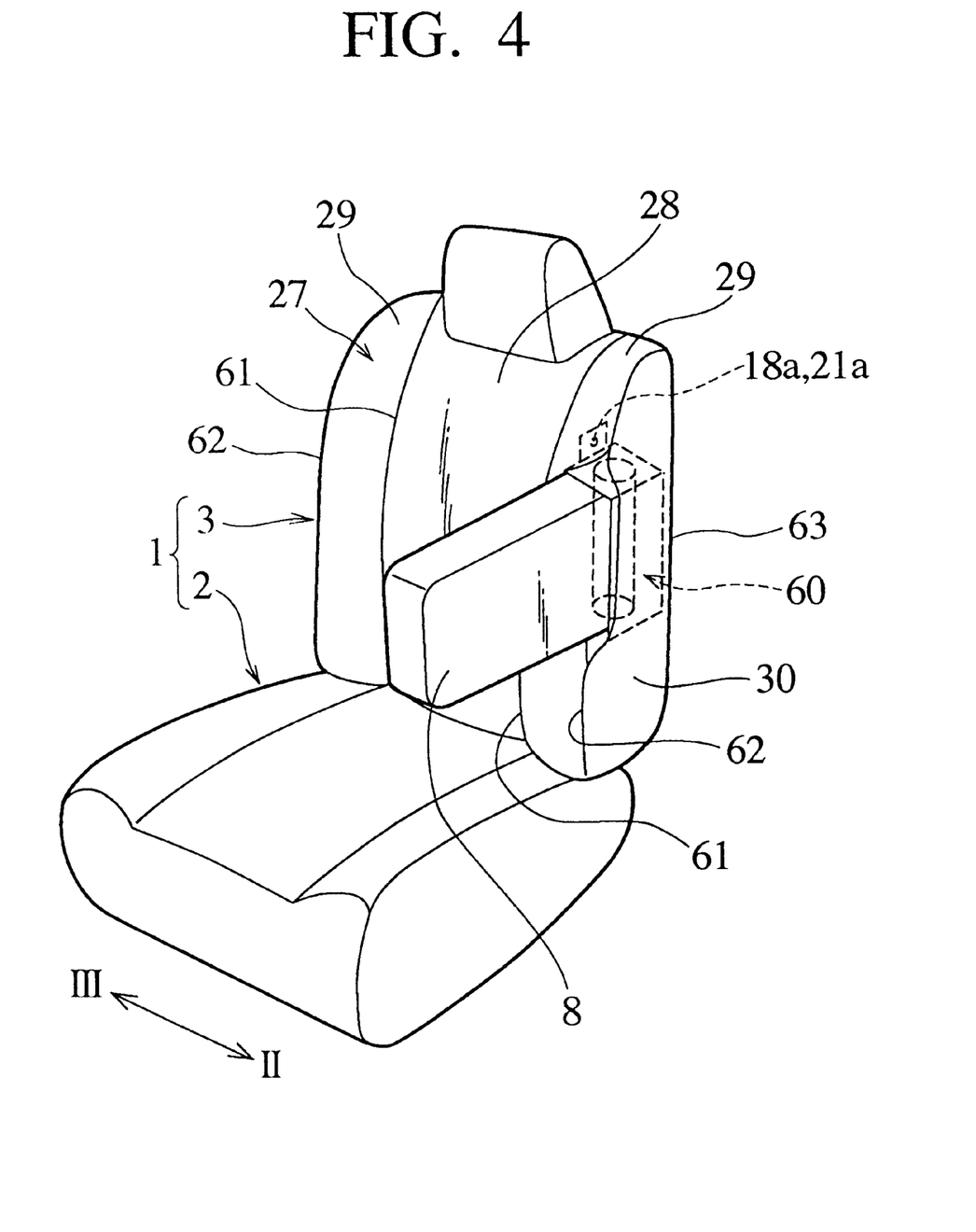
FIG. 4 is a perspective view showing the vehicle seat shown in FIG. 1 in a condition that an air bag has been spread out.

Then, a pad material 26 is provided to the seat back 3 to provide a cushion. The above-mentioned air bag module 60 is secured to the seat back 3. As shown in FIG. 3, a concave portion 26a is formed on the outer side of the pad material 26 in the vehicle width direction. The seat back frame 4, the side bracket 5, and the air bag module 60 are placed in the concave portion 26a.

The overall seat back frame 4 to which the pad material 26 and the air bag module 60 are secured is covered with a cover material 27. This cover material 27 is formed by tucking up a wadding portion in a cloth, but illustration of such cover material is omitted.

The cover material 27 is made up of a main portion 28 for covering a front central surface area of the seat back 3, a main side portion 29 for covering both front side surface areas of the seat back 3, a gusset portion 30 for covering side surface areas of the seat back 3, and a back portion 31 for constituting a rear surface area of the seat back 3. Mutual corresponding ends of the main portion 28, the main side portion 29, the gusset portion 30, and the back portion 31 are stitched together as stitching portions 61, 62, 63 along the vertical direction respectively.

Figure 5:
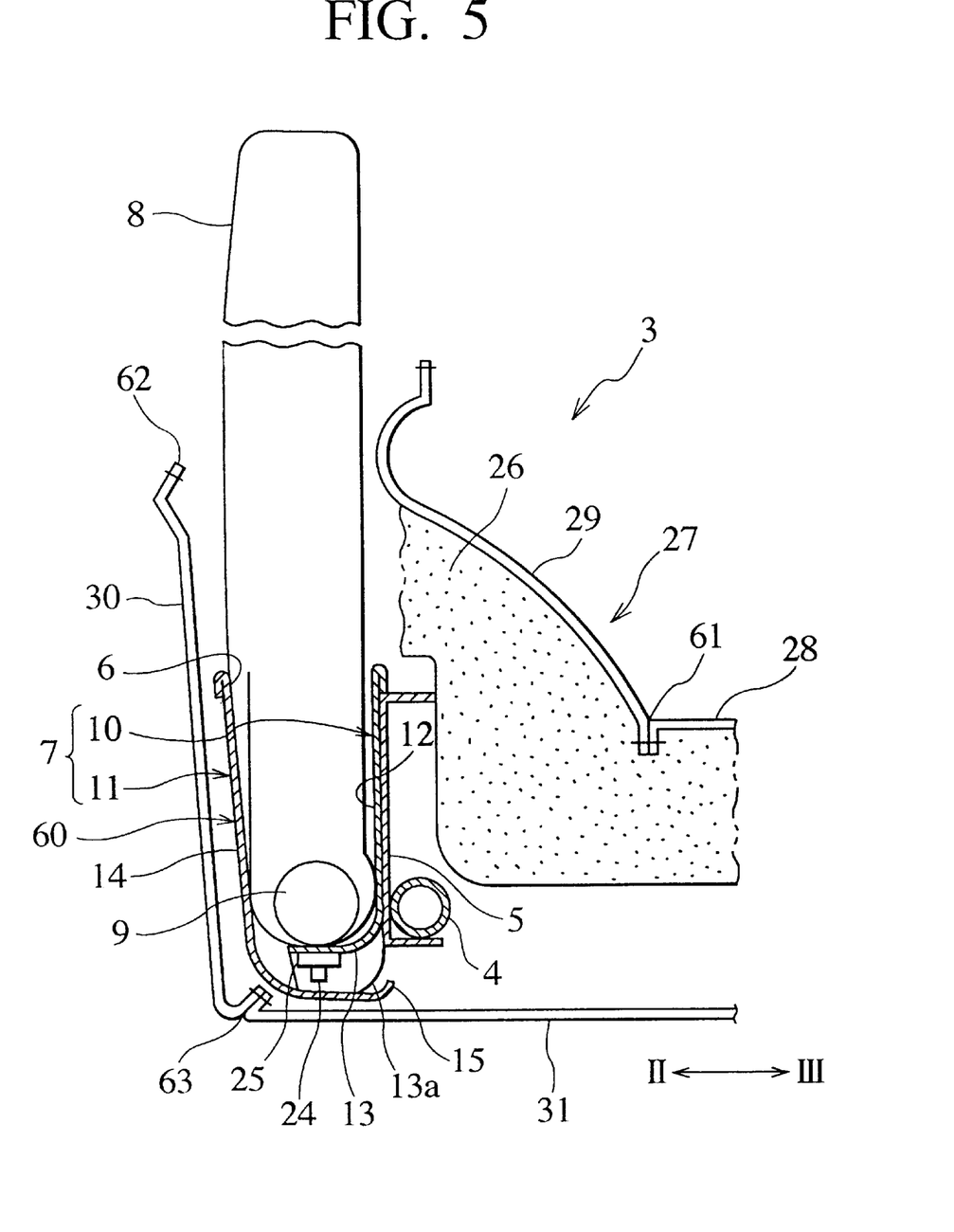
FIG. 5 is a sectional view showing the vehicle seat shown in FIG. 3 in a condition that the air bag has been spread out.
Figure 6:
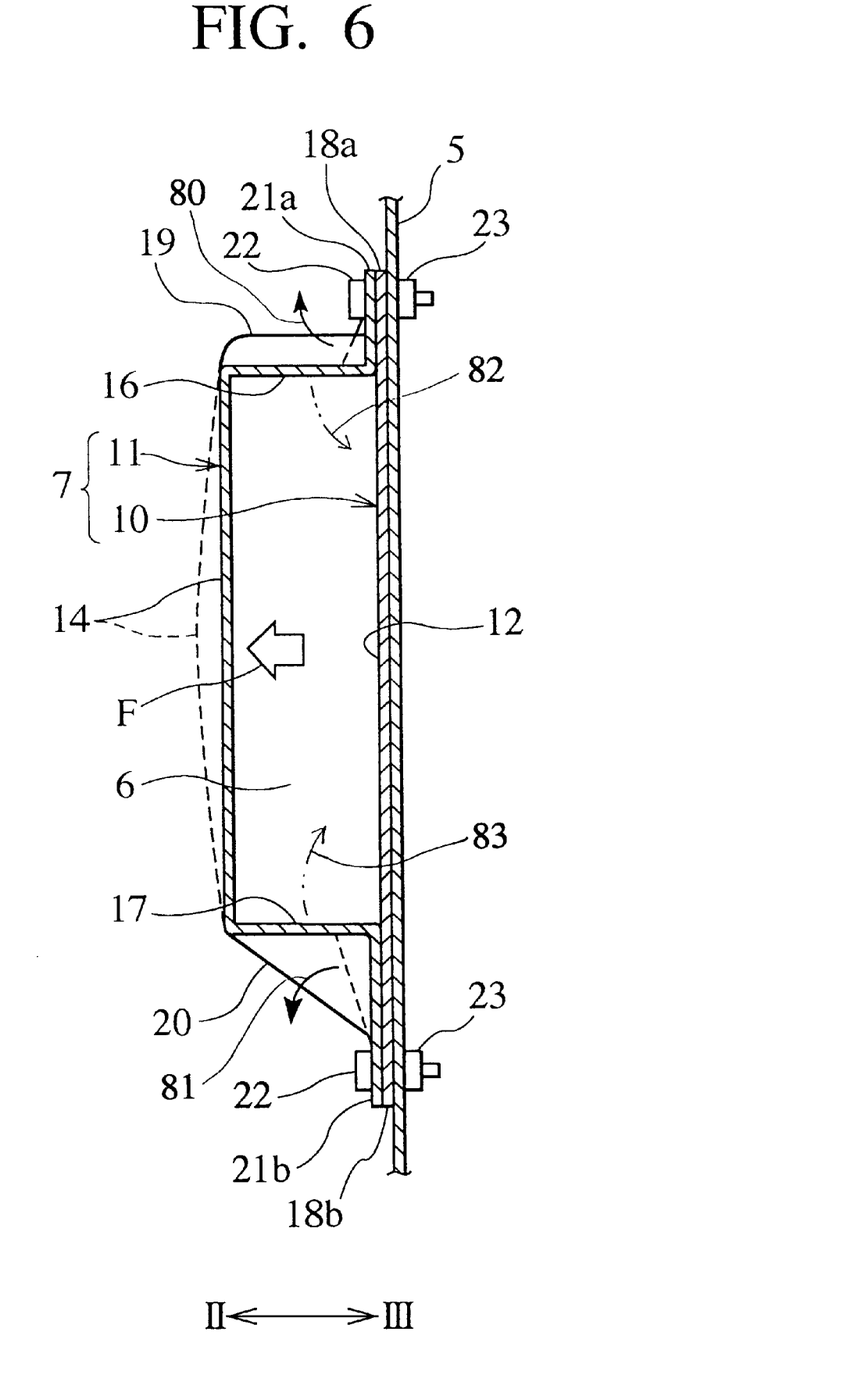
FIG. 6 is a sectional view showing a case taken along a line V—V in FIG. 2.

Subsequently, an expanding operation of the air bag 8 will be explained with reference to FIG. 5. When the side crash of the vehicle happened, a crash sensor can immediately sense such side crash and at the same time a high pressure gas can burst forth from the inflator 9 to the air bag 8. The air bag 8 is thus inflated in the metal case 7 by the high pressure gas. Hence, the air bag 8 is caused to spread out forward while extending outward the outer side surface portion 14 of the opening portion 6 of the metal case 7. Thus, the air bag 8 can break through the pad material 26 positioned in front of the air bag module 60 (see FIG. 5). In this embodiment, the air bag 8 can further break through the stitching portion 62 between the main side portion 29 and the gusset portion 30 to then spread out forward into the compartment.

A strong force F is applied to the outer side surface portion 14 of the opening portion 6 when the air bag 8 is inflated in the metal case 7, nevertheless the outer side surface portion 14 is not so deformed outward along the vehicle width direction. That is to say, since rigidity of the upper surface portion 16 and the lower surface portion 17 can be enhanced or reinforced by the bead portions 19, 20, only the outer side surface portion 14 of the opening portion 6 is deformed. In addition, the flanges 18a, 18b, 21a, 21b formed to project oppositely in the upward and downward directions are fitted to the side bracket 5 and therefore the flanges 18a, 18b, 21a, 21b and the upper and lower surface portions 16, 17 tend to be bent oppositely in the upward and downward directions 80, 81 (i.e., mutually stretching direction) around fitting points of the bolts 22 and the nuts 23 as fulcrums. Therefore, an outward extension of the outer side surface portion 14 of the outer case 11 can be suppressed compared to the case where the upper and lower surface portions 16, 17 are bent in the mutually approaching direction 82, 83.

Moreover, since longitudinal locations (i.e., back and forth locations) of the flanges 18a, 18b, 21a, 21b are set to coincide with those of the bead portions 19, 20, the flanges 18a, 18b, 21a, 21b are hard to bend around the fitting points as the fulcrums and therefore an outward extension of the opening portion 6 along the vehicle width direction can be much more suppressed. Also the shape of the lower bead portion 20 makes it hard to bend the lower flange 21b. In addition, because the flanges 18a, 18b, 21a, 21b are provided in the vicinity of the opening portion 6, rigidity of the opening portion 6 can be improved. According to this configuration, an outward extension of the opening portion 6 in the vehicle width direction can be further suppressed.

According to this embodiment, in a normal state where the air bag 8 is not spread out, the top ends of the fitting bolts 24 which protrude backward from the rear surface portion 13 of the inner case 10 are covered with the rear surface portion 15 of the outer case 11. For this reason, even when the passenger pushes or touches the seat back 3 above the rear portion of the air bag module 60 by the hand, he or she does not have a strange feeling and feels smooth or pleasant to the touch.

Since the convex portions 13a each having the projection height equivalent to the clearance 50 are formed on the rear surface portion 13 of the inner case 10, the rear surface portion 15 of the outer case 11 is never forward deformed even when it is pushed by the passenger's hand from the backward direction. At the same time, a backward reaction force is applied from the inflator 9 to the rear surface portion 13 of the inner case 10 at the time of expansion of the air bag 8. However, since such reaction force can also be transmitted to the rear surface portion 15 of the outer case 11 via the convex portions 13a, the rear surface portion 13 of the inner case 10 is in no means backward deformed.

The backward convex portions 13a have been formed on the rear surface portion 13 of the inner case 10 in the above description, but forward convex portions may be formed on the rear surface portion 15 of the outer case 11 alternatively.

What is claimed is:

1. An air bag system for a vehicle seat comprising:
   a metal case fitted to a side bracket of a seat back frame, the metal case having an opening directed to a front side of a vehicle, the metal case comprising first and second case members;
   a first rear surface portion extending from a rear end of the first case member toward the second case member;
   a second rear surface portion extending from a rear end of the second case member toward the first case member and arranged behind the first rear surface portion, the second rear surface portion being clear of and overlapping with the first rear surface portion;
   an inflator arranged in the metal case;
   an air bag installed in the metal case, the air bag being arranged to spread out from the opening toward the front of the vehicle when gas generated by the inflator is injected thereinto; and
   a fitting bolt for securing the inflator to the first rear surface portion, the fitting bolt having an end portion projection from the first rear surface portion toward the second rear surface portion, the second rear surface portion covering the end portion of the fitting bolt.

2. An air bag system for a vehicle seat according to claim 1, wherein said first case member is an inner case forming an inner part of the metal case, and
   said second case member is an outer case forming an outer part of the metal case.

3. An air bag system for a vehicle seat comprising:
   a metal case fitted to a side bracket of a seat back frame, the metal case having an opening directed to a front side of a vehicle, the metal case comprising first and second case members;
   a first rear surface portion extending from a rear end of the first case member toward the second case member;
   a second rear surface portion extending from a rear end of the second case member toward the first case member and arranged behind the first rear surface portion, the second rear surface portion being clear of and overlapping with the first rear surface portion;
   an inflator arranged in the metal case;
   an air bag installed in the metal case, the air bag being arranged to spread out from the opening toward the front of the vehicle when gas generated by the inflator is injected thereinto;
   a fitting bolt for securing the inflator to the first rear surface portion, the fitting bolt having an end portion projection from the first rear surface portion toward the second rear surface portion, the second rear surface portion covering the end portion of the fitting bolt; and
   a convex portion arranged on one of the rear surface portions, the convex portion protruding toward the other of the rear surface portions, the convex portion coming into contact with the other of the rear surface portions so as to prevent the second rear surface portion from coming into contact with the end portion of the fitting bolt when the second rear surface portion moves toward the first rear surface portion.

4. An air bag system for a vehicle seat according to claim 3, wherein a projection height of said convex portion from said one of said rear surface portions is larger than a projection height of said end portion of the fitting bolt from said first rear surface portion.

5. An air bag system for a vehicle seat according to claim 3, wherein said convex portion has a height which corresponds to a clearance dimension between said first and second rear surface portions.

6. An air bag system for a vehicle seat according to claim 3, wherein said first case member is an inner case forming an inner part of the metal case, said second case member is an outer case forming an outer part of the metal case, and said convex portion protrudes backward from the first rear surface portion of said inner case.

* * * * *